(12) United States Patent
Doshi et al.

(10) Patent No.: US 6,558,831 B1
(45) Date of Patent: May 6, 2003

(54) INTEGRATED SOFC

(75) Inventors: Rajiv Doshi, Torrance, CA (US); Jie Guan, Torrance, CA (US); Nguyen Minh, Fountain Valley, CA (US); Kurt Montgomery, Torrance, CA (US); Estela Ong, Rolling Hills Estates, CA (US); Brandon Chung, Dublin, CA (US); Gregory Lear, Redondo Beach, CA (US)

(73) Assignee: Hybrid Power Generation Systems, LLC, Los Angeles, CA (US)

( * ) Notice: Subject to any disclaimer, the term of this patent is extended or adjusted under 35 U.S.C. 154(b) by 118 days.

(21) Appl. No.: 09/642,750

(22) Filed: Aug. 18, 2000

(51) Int. Cl.$^7$ ................................. H01M 8/10
(52) U.S. Cl. ............................ 429/30; 429/33; 429/41; 429/46
(58) Field of Search ............................ 429/30, 33, 41, 429/46

(56) References Cited

U.S. PATENT DOCUMENTS

| | | | |
|---|---|---|---|
| 5,171,645 A | * 12/1992 | Khandkar | .................... 427/115 |
| 5,286,322 A | 2/1994 | Armstrong et al. | |
| 5,306,411 A | 4/1994 | Mazanec et al. | |
| 5,712,055 A | 1/1998 | Khandkar et al. | |
| 5,725,965 A | 3/1998 | Wachsman et al. | |
| 5,731,097 A | 3/1998 | Miyashita et al. | |
| 5,741,406 A | 4/1998 | Barnett et al. | |
| 5,911,860 A | 6/1999 | Chen et al. | |
| 5,922,486 A | 7/1999 | Chiao | |
| 6,004,688 A | * 12/1999 | Goodenough et al. | ......... 429/33 |
| 6,287,716 B1 | * 9/2001 | Hashimoto et al. | ........... 429/33 |

OTHER PUBLICATIONS

De Souza et al., *YSZ–Thin–Film Electrolyte for Low–Temperature Solid Oxide Fuel Cell*, Proc. $2^{nd}$ Euro. SOFC Forum, 2, 677–685 (1996).

De Souza et al., *Thin–film solid oxide fuel cell with high performance at low–temperature*, Solid State Ionics, 98, 57–61 (1997).

Doshi et al., *Development of Solid–Oxide Fuel Cells That Operate at 500° C.*, J. Electrochem. Soc., 146 (4), 1273–1278 (1999).

Huang et al., *Superior Perovskite Oxide–Ion Conductor; Strontium– and Magnesium–Doped $LaGaO_3$: I, Phase Relationships and Electrical Properties*, J. Am. Ceram. Soc., 81, [10], 2565–75 (1998).

Ishihara et al., *Intermediate Temperature Solid Oxide Fuel Cells Using $LaGaO_3$ Electrolyte Doped with Transition Metal Cations*, Proc. Electrochem. Soc. Mtg., Seattle, May 2–5 (1999).

Kim et al., *Polarization Effects in Intermediate Temperature, Anode–Supported Solid Oxide Fuel Cells*, J. Electrochem. Soc., 146 (1), 69–78 (1999).

Minh, *Ceramic Fuel Cells*, J. Am. Ceram. Soc., 76 [3], 563–88 (1993).

Minh, *Development of Thin–Film Solid Oxide Fuel Cells for Power–Generation Applications*, Proc. $4^{th}$ Int'l Symp. On SOFCs, 138–145 (1995).

Minh, *High–performance reduced–temperature SOFC technology*, Int'l Newsletter Fuel Cell Bulletin, No. 6, 9–11 (1999).

Steele, *Oxygen transport and exchange in oxide ceramics*, J. Power Sources, 49, 1–14 (1994).

* cited by examiner

*Primary Examiner*—Laura Weiner
(74) *Attorney, Agent, or Firm*—Sutherland Asbill & Brennan LLP

(57) ABSTRACT

A solid oxide fuel cell comprises an anode, a cathode opposite to the anode, and an electrolyte between the anode and cathode. The electrolyte includes a barrier layer that prevents chemical interactions between the electrolyte and the anode, in addition to preventing elemental losses from the electrolyte. The electrolyte further includes a strengthening layer having alternating layer elements that provide fracture resistance to the electrolyte.

36 Claims, 4 Drawing Sheets

INTEGRATED SOFC

BACKGROUND OF THE INVENTION

The present invention generally relates to solid oxide fuel cells (SOFCs) and, more particularly, to a multilayered, multifunctional electrolyte in solid oxide fuel cells having high mechanical strength, high ionic conductivity, stability in air and fuel, chemical compatibility to other portions of the fuel cell, and reduced temperature operation.

A solid oxide fuel cell is an energy conversion device that produces direct-current electricity by electrochemically reacting a gaseous fuel (e.g., hydrogen) with an oxidant (e.g., oxygen) across an oxide electrolyte. The key features of current SOFC technology include all solid-state construction, multi-fuel capability, and high-temperature operation. Because of these features, the SOFC has the potential to be a high-performance, clean and efficient power source and has been under development for a variety of power generation applications.

Under typical operating conditions, an SOFC single cell produces less than 1 V. Thus, for practical applications, single cells are stacked in electrical series to build voltage. Stacking is provided by a component, referred to as an interconnect, that electrically connects the anode of one cell to the cathode of the next cell in a stack. Conventional SOFCs are operated at about 1000° C. and ambient pressure.

An SOFC single cell is a ceramic tri-layer consisting of an oxide electrolyte sandwiched between an anode and a cathode. The conventional SOFC materials are yttria-stabilized zirconia (YSZ) for the electrolyte, strontium-doped lanthanum manganite (LSM) for the cathode, nickel/YSZ for the anode, and doped lanthanum chromite for the interconnect. Currently, there are two basic cell constructions for SOFCs: electrolyte-supported and electrode-supported.

In an electrolyte-supported cell, the electrolyte is the mechanical support structure of the cell, with a thickness typically between 150 and 250 $\mu$m. Electrolyte-supported cells are used, for example, in certain planar SOFC designs. In an electrode-supported cell, one of the electrodes (i.e., the anode or cathode) is the support structure. The electrolyte is a thin film (not greater than 50 $\mu$m) that is formed on the support electrode. Tubular, segmented-cells-in-electrical-series, and certain planar SOFC designs, employ this type of cell.

Conventional YSZ-based SOFCs typically employ electrolytes thicker than 50 $\mu$m and require an operating temperature of 1000° C. to minimize electrolyte ohmic losses. The high-temperature operation imposes stringent material and processing requirements to the fuel cell system. Thus, the recent trend in the development of SOFCs is to reduce the operating temperature below 800° C. The advantages of reduced temperature operation for the SOFC include a wider choice of materials, longer cell life, reduced thermal stress, improved reliability, and potentially reduced fuel cell cost. Another important advantage of reduced temperature operation is the possibility of using low-cost metals for the interconnect.

Various attempts have been made to reduce the operating temperature of YSZ-based SOFCs while maintaining operating efficiency. One attempted method reduces the thickness of the electrolyte to minimize resistance losses. Various methods have been evaluated for making cells with thin films (about 5 to 25 $\mu$m thick). Electrode-supported cells (specifically, anode-supported cells) with thin electrolyte films have shown high performance at reduced temperatures. Power densities over 1 W/cm$^2$ at 800° C. have been reported, for example, in de Souza et al., *YSZ-Thin-Film Electrolyte for Low-Temperature Solid Oxide Fuel Cell,* Proc. 2$^{nd}$ Euro. SOFC Forum, 2, 677–685 (1996); de Souza et al., *Thin-film solid oxide fuel cell with high performance at low-temperature,* Solid State Ionics, 98, 57–61 (1997); Kim et al., *Polarization Effects in Intermediate Temperature, Anode-Supported Solid Oxide Fuel Cells,* J. Electrochem. Soc., 146 (1), 69–78 (1999); Minh, *Development of Thin-Film Solid Oxide Fuel Cells for Power-Generation Applications,* Proc. 4$^{th}$ Int'l Symp. On SOFCs, 138–145 (1995); Minh et al., *High-performance reduced-temperature SOFC technology,* Int'l Newsletter Fuel Cell Bulletin, No. 6, 9–11 (1999). An alternative attempt at reducing operating temperature has involved the use of alternate solid electrolyte materials with ionic conductivity higher than YSZ, as described in Minh, *Ceramic Fuel Cells,* J. Am. Ceram. Soc., 76 [3], 563–88 (1993). However, the work on alternate electrolyte materials is still at a very early stage.

The electrolyte and cathode have been identified as barriers to achieving efficiency at reduced operating temperatures due to their significant performance losses in current cell materials and configurations. With YSZ electrolyte-supported cells, the conductivity of YSZ requires an operating temperature of about 1000° C. for efficient operation. For example, at about 1000° C. for a YSZ electrolyte thickness of about 150 $\mu$m and about a 1 cm$^2$ area, the resistance of the electrolyte is about 0.15 ohm based on a conductivity of about 0.1 S/cm. The area-specific resistance (ASR) of the electrolyte is, therefore, about 0.15 ohm-cm$^2$. For efficient operation, a high-performance cell with an ASR of about 0.05 ohm-cm$^2$ is desired. To achieve an ASR about 0.05 ohm-cm$^2$ at reduced temperature operation (for example, 800° C.), the required thickness (i.e., 15 $\mu$m) of YSZ can be calculated. If the desired operating temperature is less than 800° C., while the ASR remains the same, either the thickness of YSZ must be further reduced or highly conductive alternate electrolyte materials must be used.

For alternate electrolyte materials in SOFCs, the desired operating temperature determines the choice of materials to achieve high performance. The conductivity and stability of the electrolyte are two key parameters in the selection of the electrolyte material. The highest ionic conductivities are typically found in the fluorite, perovskite, and brownmillerite structures, as indicated by Boivin et al., Chem Mater., 10, p. 2870 (1998). These include doped materials of $Bi_2O_3$, $CeO_2$, $LaGaO_3$, and Sr—Fe—Co oxides. Of these materials, doped $Bi_2O_3$, is unstable in a fuel atmosphere and doped $Sr_2Fe_2O_5$ is a mixed ionic and electronic conductor. Therefore, these two materials are unsuitable for use as SOFC electrolytes. Doped $CeO_2$ in one layer and $YBa_2Cu_3O_7$ in another layer of a bilayer electrolyte have been attempted to increase the open circuit voltage (OCV) in U.S. Pat. No. 5,731,097. Another bilayer electrolyte is shown in U.S. Pat. No. 5,725,965, wherein one layer of doped $Bi_2O_3$ is protected from the fuel environment by a protective layer of doped $CeO_2$.

At reduced operating temperatures of about 550 to 700° C., ceria ($CeO_2$) doped with Gd (CGO) and lanthanum gallate ($LaGaO_3$) doped with Sr, Mg (LSGM) or Fe in addition to Sr and Mg (LSGMFe) have been considered due to their high conductivity [Feng et al., Eur. J. Solid St. Inorg. Chem., 31, p. 663 (1994); Huang et al., *Superior Perovskite Oxide-Ion Conductor; Strontium- and Magnesium-Doped $LaGaO_3$: I, Phase Relationships and Electrical Properties,* J. Am. Ceram. Soc., 81, [10], 2565–75 (1998); Steele, *Oxygen transport and exchange in oxide ceramics,* J. Power Sources, 49, 1–14 (1994); Ishihara et al., *Intermediate Temperature Solid Oxide Fuel Cells Using LaGaO₃ Electrolyte Doped with Transition Metal Cations,* Proc. Electrochem. Soc. Mtg., Seattle, May 2–5 (1999)]. For example, a 15 μm LSGMFe electrolyte can be operated at about 525° C. with an ASR of 0.05 ohm-cm². Of the materials above, CGO has significant electronic conductivity above 500° C. in the fuel atmosphere, leading to low open circuit voltage and decreased fuel cell efficiency.

Therefore, to be a useful electrolyte, CGO must either be used at 500° C. or lower according to Doshi et al., *Development of Solid-Oxide Fuel Cells That Operate at 500° C.,* J. Electrochem. Soc., 146 (4), 1273–1278 (1999), or modified or protected against reduction by the fuel environment. LSGM ($La_{0.9}Sr_{0.1}Ga_{0.8}Mg_{0.2}O_3$) and LSGMFe ($La_{0.9}Sr_{0.1}Ga_{0.8}Mg_{0.17}Fe_{0.3}O_3$) have high ionic conductivity but react with the Ni typically used in anodes. In addition, some loss of the gallium element occurs from evaporation in the fuel atmosphere over time. Accordingly, cell performance degrades over time. Therefore, a gallate-based electrolyte needs to be protected against interactions with the nickel of the anode and elemental losses. An ideal electrolyte would have the high ionic conductivity of LSGMFe, the chemical compatibility of YSZ or $CeO_2$ with Ni, and the mechanical strength of YSZ.

The fabrication process that the above materials undergo is an important factor that affects the performance of a fuel cell. Several techniques are available to manufacture cells in either of the two classes of cell construction (i.e., electrolyte-supported and electrode-supported), including thick-film electrolytes and thin-film electrolytes.

The term "thick-film electrolyte" is used to describe self-supported electrolytes used as a substrate to which electrodes are added. Self-supported electrolytes require sufficient thickness (i.e., 150 to 250 μm) for practical handling. Tape casting is typically used to fabricate these dense membranes. During tape casting, a slurry of fine ceramic particles dispersed in a fluid vehicle is cast as a thin tape on a carrier substrate using a doctor blade. The tape is then dried, removed from the carrier substrate, and fired to produce a dense substrate. After sintering, deposition techniques such as hand painting, screen-printing, or spray coating are used to attach electrodes to both sides. The high ohmic resistance of the thick electrolyte necessitates higher operating temperatures of around 1000° C. to reduce the ohmic polarization losses due to the electrolyte.

Driven by the benefits of reducing ohmic loss in the electrolyte at lower temperatures (i.e., 550 to 800° C.), SOFC development efforts have focused attention on "thin-film electrolytes" (i.e., 5 to 25 μm) supported on thick electrodes, such as described in U.S. Pat. No. 5,741,406. A number of selected fabrication processes used for making SOFCs, especially thin YSZ electrolytes, is listed in Table 1.

TABLE 1

| Process | Description |
| --- | --- |
| Spray Pyrolysis | A solution consisting of powder precursor and/or particles of the final composition is sprayed onto a hot substrate (400 to 600° C.), followed by a sintering step to densify the layer. |
| Plasma Spraying | A plasma containing fine ceramic particles is projected with a high speed towards a substrate to deposit a thin layer. |
| CVD/EVD | A dense layer of electron or ion-conducting oxide is deposited on a porous substrate by a chemical vapor deposition (CVD)/electrochemical vapor deposition (EVD) process. |
| Sputtering | An electrical discharge in argon/oxygen mixture is used to deposit materials on substrates. |
| Spin Coating | A sol gel precursor is applied to a spinning substrate surface. Heat treatment of the coating at relatively low temperatures (~600° C.) produces a dense, homogenous, thin layer (0.2 to 2 μm). |
| Dip Coating | Porous substrates are immersed in YSZ slurries of colloidal-sized particles. Deposited layers are then dried and fired. |
| Electrophoretic Deposition | YSZ powder particles are deposited from a suspension onto a substrate electrode of opposite charge when a DC electrical field is applied Numerous coating/firing cycles are required to produce a fully dense, 5 μm layer. |
| Tape Calendering | Plastic forming process involving squeezing a softened thermo-plastic polymer/ceramic powder mixture between two rollers to produce a continuous sheet of material. |

Other thin-film techniques investigated for SOFC applications include vapor-phase electrolytic deposition, vacuum evaporation, liquid-injection plasma spraying, laser spraying, jet vapor deposition, transfer printing, coat mix process, sedimentation method, electrostatic spray pyrolysis, and plasma metal organic chemical vapor deposition.

Additional related references are found in U.S. Pat. Nos. 5,922,486; 5,712,055; and 5,306,411.

As can be seen, there is a need for an SOFC fabrication process that ensures that no condition or environment in any process step destroys the desired characteristics of any of the materials. Low cost and scalability in the fabrication process is also needed. An electrolyte for use in an SOFC is needed that provides high ionic conductivity, chemical compatibility with Ni or other transition metals, and mechanical strength. In particular, an SOFC electrolyte is needed that can be used at reduced operating temperatures not greater than about 800° C., while still providing high performance, including an ASR about 0.05 ohm-cm². A thin-film electrolyte about 5 to 25 μm thick is also needed for use at reduced operating temperatures. An electrolyte with high strength that is resistant to a fuel environment is another need.

SUMMARY OF THE INVENTION

The integrated approach of the present invention provides a high-performance, reduced-temperature SOFC. The approach is based on materials and structures which, when combined, are capable of increased performance in about the 550 to 800° C. operating range while maintaining functional integrity up to about 1000° C. The materials and fabrication process are economical, scalable, and amenable to high-volume manufacture of fuel cells.

The present invention is based on a thin-film, multilayer, multifunction electrolyte supported on an anode substrate to minimize ohmic losses. Although new electrolyte materials with high conductivities have been reported, each one has inherent problems that need to be overcome, e.g., chemical compatibility, electronic conductivity, and mechanical strength. The present invention is a multilayer composite of highly conductive electrolytes that provides a combination of superior properties while avoiding the problems mentioned above.

In one aspect of the present invention, a solid oxide fuel cell comprises an anode; a cathode opposite to the anode;

and an electrolyte between the anode and cathode, with the electrolyte including a barrier layer proximate to the anode, and the barrier layer preventing chemical interactions between the electrolyte and anode in addition to preventing elemental losses from the electrolyte.

In a further aspect of the present invention, a solid oxide fuel cell comprises an anode; a cathode opposite to the anode; and an electrolyte between the anode and cathode, with the electrolyte including a strengthening layer proximate to the cathode, and the strengthening layer having alternating layer elements that provide fracture resistance to the electrolyte.

In another aspect of the present invention, a method of making a solid oxide fuel cell comprises forming an electrolyte between an anode and a cathode; minimizing elemental losses from the electrolyte by the use of a barrier layer proximate to the anode; and preventing chemical interactions between the electrolyte and anode by the use of the barrier layer.

These and other features, aspects and advantages of the present invention will become better understood with reference to the following drawings, description and claims.

BRIEF DESCRIPTION OF THE DRAWINGS

FIG. 4b is a micrograph (180×) of the strengthening layer shown in FIG. 4a;

DETAILED DESCRIPTION OF THE INVENTION

Figure 1:
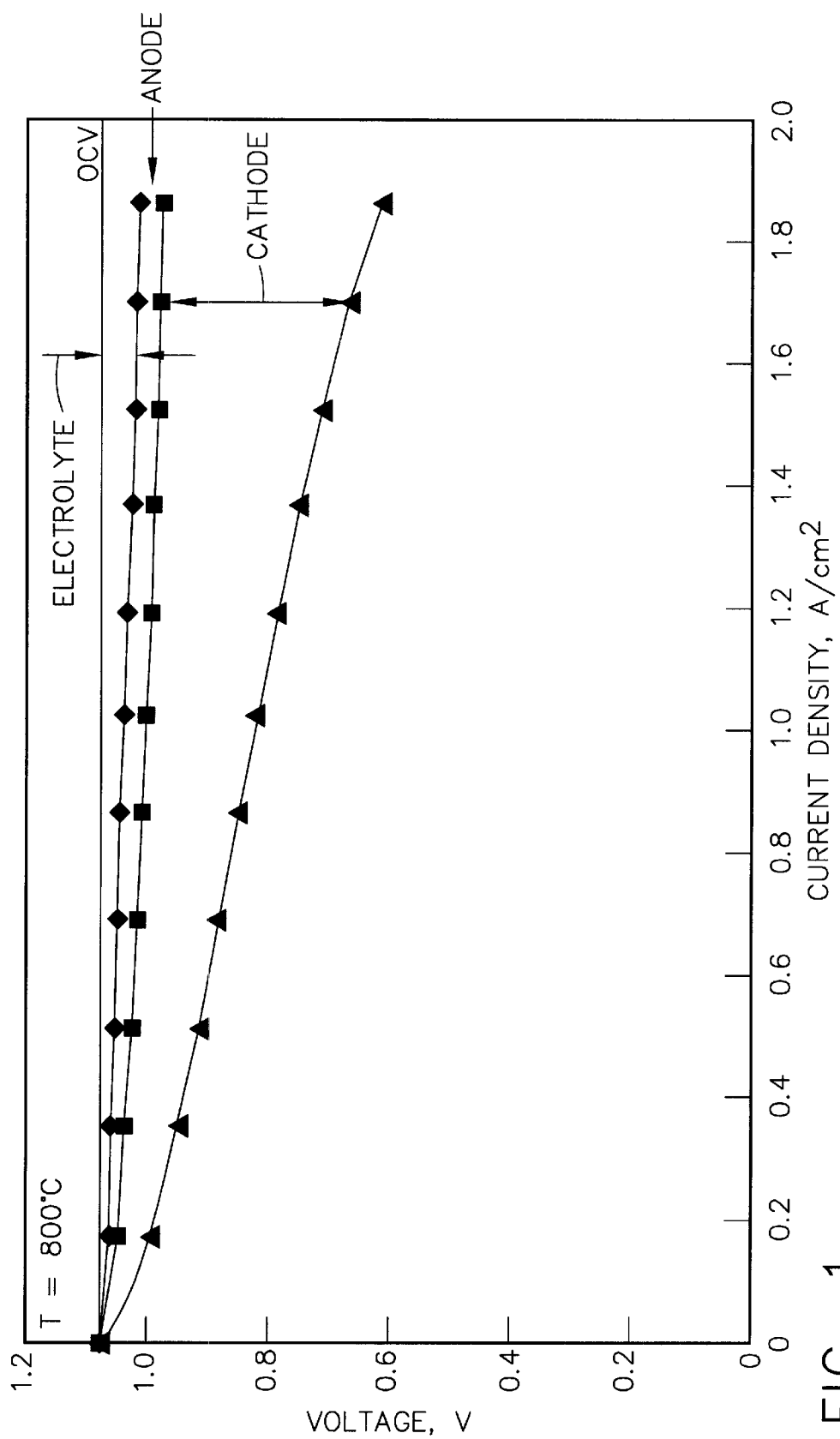
FIG. 1 is a graph of voltage versus current density for a prior art SOFC.
Figure 2:
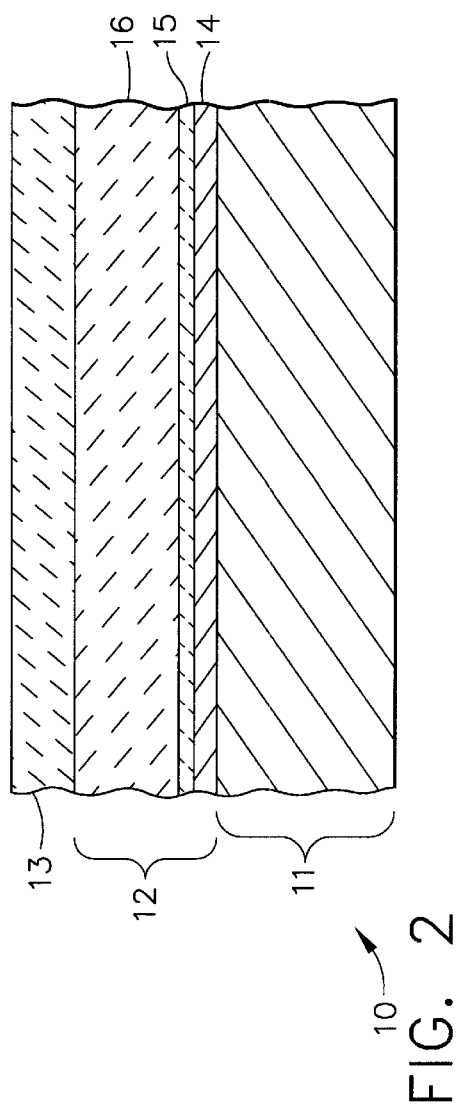
FIG. 2 is a schematic cross section of an integrated SOFC according to an embodiment of the present invention.

FIG. 2 schematically depicts a cross section of an integrated solid oxide fuel cell 10 according to one preferred embodiment of the present invention. The term "integrated" is intended to refer to an SOFC that exhibits high ionic conductivity, chemical compatibility within itself, and high mechanical strength which, in the past, has not been satisfactorily achieved. In the past, one desired characteristic was balanced against other desired characteristics, leading to less than optimal performance characteristics in some areas.

In the embodiment of FIG. 2, the fuel cell 10 generally comprises an anode 11, a cathode 13, and an electrolyte 12 sandwiched therebetween. The anode 11 is of any well-known design, such as that described in U.S. Pat. No. 5,286,322 and incorporated herein by reference. In particular, the anode 11 is comprised of an anode electrolyte compound that provides ionic conduction and an anode electronic conducting material that provides electronic conduction and catalytic activity. As examples, the anode electrolyte compound can include doped zirconia, doped ceria and gallate-based oxides. Dopants for zirconia can include scandium, ytrrium, other rare earths and Group II elements such as Ca, Sr, Mg, and Ba or oxides of all of the above. Examples of useful anode electronic conducting materials include transition metals and electronic conducting oxides. Some preferred transition metals include Ni, Co, Cr, Cu and Fe. Useful electronic conducting oxides include perovskite oxides with the formula $ABO_{3-d}$ where A is a rare earth element or a combination of rare earth and smaller amounts of a dopant, B is a transition metal or a combination of transition metal with smaller amounts of a dopant, and d is greater than or equal to 0. Other useful structures are brownmillerites based on $A_2B_2O_{5-d}$ and pyrochlores based on $A_2B_2O_{7-d}$ with stability in the fuel atmosphere.

As with the anode 11, the cathode 13 can be of any well-known design, such as that described in U.S. Pat. No. 5,286,322 and incorporated herein by reference. The cathode 13 comprises a cathode electrolyte compound that provides ionic conduction and a cathode electronic conducting material that provides electronic conduction and catalytic activity. The cathode electronic conducting materials include doped lanthanum manganite, doped lanthanum ferrites, doped lanthanum cobaltites, doped lanthanum chromites, similar materials with rare earths other than lanthanum, and combinations of manganites, ferrites, cobaltites and chromites, brownmillerites based on $A_2B_2O_{5-d}$ and pyrochlores based on $A_2B_2O_{7-d}$. Dopants for lanthanum manganites can include strontium, calcium, magnesium, and barium. Examples of useful cathode electrolyte compounds include doped bismuth oxides e.g. $Bi_{0.75}Sr_{0.25}O_{1.375}$, doped lanthanum gallates e.g. $La_{0.9}Sr_{0.1}Ga_{0.8}Mg_{0.17}Fe_{0.3}O_3$, $La_{0.9}Sr_{0.1}Ga_{0.8}Mg_{0.115}Co_{0.0085}O_{3-d}$, doped ceria e.g. $Ce_{0.8}Gd_{0.2}O_{1.9}$, and doped zirconia e.g. $Zr_{0.92}Y_{0.08}O_{1.96}$.

The electrolyte 12 is a thin-film (about 5 to 25 $\mu$m thick) multilayer structure incorporating a number of different functional layers. These layers impart certain specific properties to the composite electrolyte 12. More specifically, the electrolyte 12 comprises a transition layer 14 adjacent the anode 11, a barrier layer 15 adjacent a side of the transition layer 14 opposite the anode 11, and a strengthening layer 16 adjacent a side of the barrier layer 15 opposite the transition layer 14. In general, the electrolyte 12 is comprised of at least one transition metal reactive compound. In other words, the electrolyte 12 is comprised of a compound that is normally chemically reactive with a transition metal that might exist, for example, in the anode 11.

The transition metal reactive compound can be, as an example, a gallate compound having gallium and a rare earth metal. The rare earth metal is preferably characterized by an atomic number between about 57 to 71. Below an atomic number of about 57 and above about 71 ionic conduction tends to decrease and resistance of electrolyte tends to increase. Specific examples of gallate compounds that can be used in practicing the present invention include $LaGaO_{3-d}$, $ErGaO_{3-d}$, and $DyGaO_{3-d}$ where d is greater than or equal to zero.

The gallate compound may optionally include a first substitution element that can be partly substituted for the rare earth metal. The reference to "partly" is intended to mean less than 50%. The first substitution metal functions to create oxygen vacancies and can therefore include Sr, Ba, Mg, Ca, and combinations thereof. In such instances, the gallate compounds can include $La_{0.9}Sr_{0.1}GaO_{3-d}$ and $La_{0.8}Sr_{0.2}GaO_{3-d}$. A second substitution element may also be included in the gallate compound and partly substituted for the gallium. The second substitution element serves to create additional oxygen vacancies and to increase the mobility of oxygen vacancies and examples of the same include Sr, Ba, Mg, Ca, Mn, Fe, Co, Cr, Cu and combinations thereof. Examples of such substituted compounds include $La_{0.9}Sr_{0.1}Ga_{0.8}Mg_{0.2}O_{3-d}$, $La_{0.9}Sr_{0.1}Ga_{0.8}Mg_{0.17}Fe_{0.03}O_{3-d}$ and $La_{0.9}Sr_{0.1}Ga_{0.8}Mg_{0.115}CO_{0.0085}O_{3-d}$.

The transition layer 14 of the electrolyte 12 provides a physical or material transition between the anode 11 and the electrolyte 12. Specifically, the transition layer 14 minimizes a thermal expansion mismatch between the anode 11 and the electrolyte 12 during operation of the fuel cell 10 preferably between about 550 to 800° C. The transition layer 14 is also preferably chemically compatible with the anode 11 and the barrier layer 15. In the fuel environment, the transition layer 14 should have mixed ionic and electronic conducting properties, thus facilitating the charge-transfer reaction to produce a current. Given the above characteristics, the composition of the transition layer 14 is dependent upon the compositions of the anode 11 and the remainder of the electrolyte 12 (particularly, the barrier layer 15 in this embodiment).

In a preferred embodiment, the transition layer 14 comprises a transition electrolyte compound that provides ionic conduction and a transition electronic conducting material that provides electronic or mixed conduction. The transition electrolyte compound can include compounds such as doped ceria, doped zirconia, doped hafnia, doped urania, and doped thoria. The transition electronic conducting material can include materials such as transition metals and electronic conducting oxides. The useful transition metals include Ni, Fe, Cr, Co and Cu. Electronic conducting oxides include ceria-zirconia solid solutions e.g. $Ce_{0.9}Zr_{0.1}O_2$, perovskites e.g. $La_{0.8}Sr_{0.2}Cr_3$, and pyrochlore structures e.g. $La_{2-x}Sr_xZr_{2-y}Ti_yO_{7-d}$ with 0<x,y<2 where the compounds are stable in a fuel atmosphere.

The thickness of the transition layer 14 can vary but preferably comprises about 1 to 30 micrometers. Below about 1 micrometer, the transition layer tends to be ineffective, while above about 30 micrometer, most of the reactions tend to occur in the transition layer making the anode ineffective for electrochemical reactions. As such, the transition layer 14 is typically between about 2 to 10 $\mu$m thick.

The barrier layer 15 of the electrolyte 12 that is proximate to the anode 11 prevents chemical reactions between the electrolyte 12 and the anode 11. It also prevents elemental losses (such as gallium) from the electrolyte 12 (particularly, from the strengthening layer 16). In order to prevent elemental loses, the barrier layer 15 is preferably of a sufficiently dense character to chemically isolate the electrolyte 12 material from the fuel environment. Preferably, the barrier layer 15 includes a barrier electrolyte compound that provides ionic conductivity. The barrier electrolyte compound can include compounds such as doped ceria, doped hafnia, doped urania, doped thoria, and doped zirconia. In a second embodiment, the transition layer includes mixed conducting oxides with ionic and electronic conductivity. Useful mixed conducting oxides include doped ceria, doped $TiO_2$, Ti doped zirconia, perovskite oxides with the formula $ABO_{3-d}$ where A is a rare earth element or a combination of rare earth and smaller amounts of a dopant, B is a transition metal or a combination of transition metal with smaller amounts of a dopant, d is greater than or equal to 0, structures such as brownmillerites based on $A_2B_2O_{5-d}$ and pyrochlores based on $A_2B_2O_{7-d}$, and ceria-zirconia solid solutions.

The thickness of the barrier layer 15 can vary but it should be thick enough to prevent reactions between the anode 11 and electrolyte 12, yet not thick enough to significantly affect the ionic conductivity of the electrolyte 12. The barrier layer 15 preferably is about 1 to 30 micrometers thick. Below about 1 micrometer, the barrier layer tends to be ineffective due to nonuniformity of thickness leaving some electrolyte areas exposed, while above about 30 micrometers, the resistance contribution from the barrier layer tends to be significant. As such, the barrier layer 15 is typically between about 2 to 10 $\mu$m thick.

The strengthening layer 16 of the electrolyte 12 that is proximate to the cathode 13 serves to increase a fracture resistance of the electrolyte 12 over that of the individual starting materials in the layer 16 described below. At the same time, the electrolyte 12 maintains its ionic conducting properties through selection of an appropriate combination of ionic conducting layers described below.

The strengthening layer 16 includes a plurality of alternating layer elements or ionic conducting layers of two different electrolyte material systems. In other words, the layer 16 has a plurality of multilayer structures stacked on top of one another. While a bilayer structure is a preferred embodiment of the present invention, it is contemplated that more that two layers may be incorporated into the multilayer structure, for example, to increase electrolyte strength and deflect any crack defects.

The two material systems in the bilayer structure include a first oxygen ion conductor compound and a second oxygen ion conductor compound. The first and second oxygen ion conductor compounds are characterized by ionic conductivities between about 0.001 to 1 S/cm. Preferred conductor compounds include doped zirconia, doped zirconia with alumina, ceria with doped zirconia and alumina, a rare earth gallate compound, a rare earth gallate compound with ceria, and a rare earth gallate compound with ceria and alumina.

The specific electrolyte materials selected for the alternating layers are generally dependent upon temperature of operation and performance desired. Further, while the present invention preferably contemplates that only two different materials are incorporated into the alternating layers, more than two different materials are contemplated. The use of more than two different materials may be useful, for example, to increase strength further and to impart fracture resistance. Additionally, while the present invention contemplates that each bilayer structure is preferably identical to each other in the stack of such structures, the bilayer structures can differ from one another.

The relative thicknesses of the alternating layers in a single bilayer structure can vary, but is preferably in a ratio of about 1:1. Also, while the total number of bilayer structures can vary, a maximum number of layers is limited by the need for having a thin film electrolyte 12 with an overall thickness between about 5 to 25 $\mu$m. Within such thickness range, and given the proportionate thicknesses of the transition layer 14 and the barrier layer 15 described above, the strengthening layer 16 is typically about 5 to 15 $\mu$m thick.

Figure 3:
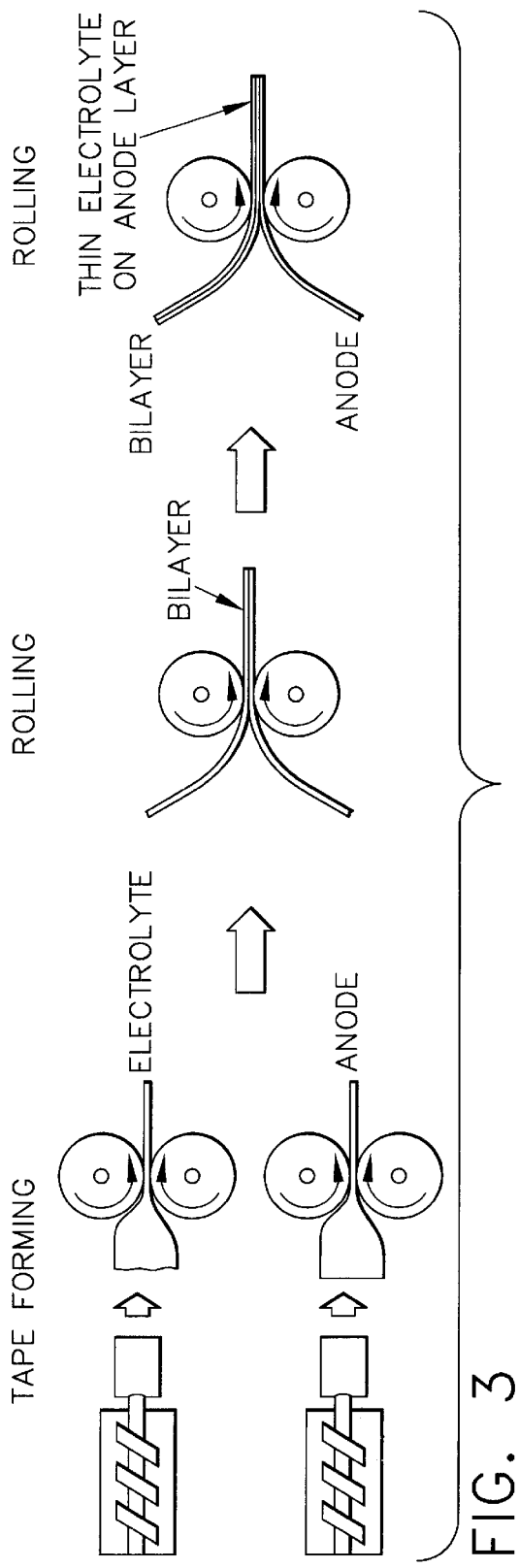
FIG. 3 is a flow chart depicting a method of making a thin film electrolyte supported on an anode in an integrated SOFC according to an embodiment of the present invention.

FIG. 3 is a flow chart depicting a method of making a thin film electrolyte 12 supported on an anode 11 in an integrated SOFC 10 according to an embodiment of the present invention. The electrolyte 12 is made in accordance with any well-known tape calendaring process, such as that described in U.S. Pat. No. 5,286,322 and incorporated herein by reference.

Briefly, the starting materials for the tapes, either electrolyte (e.g., YSZ) or anode support electrode (e.g., Ni/YSZ), are conventional powders, organic binders, and plasticizers that are combined in a high-shear mixer to create a homogenous plastic mass. Each plastic mass is then rolled to produce a thin flexible sheet on the order of about 0.25 to 2.5 mm thick. These sheets, electrolyte and anode, are then rolled together to from a bilayer and subsequently rolled to reduce the thickness of each layer. Another anode tape is added to the bilayer and again rolled down. The addition of anode tapes has the effect of reducing the electrolyte thickness while maintaining a desired overall thickness of the bilayer. The addition of the anode tapes is repeated until the desired thickness of electrolyte is reached. At this point, the bilayer is cut to the desired shape and size.

The above basic process can be modified to form multiple different and distinct layers by adding the appropriate green tapes into the rolling sequence. Multiple repeating layers can also be fabricated. In such case, the bilayer is made as above and is then cut in half, and one half is placed on top of the other and rolled. This is repeated until the desired structure is completed.

EXAMPLES

Figure 4A:
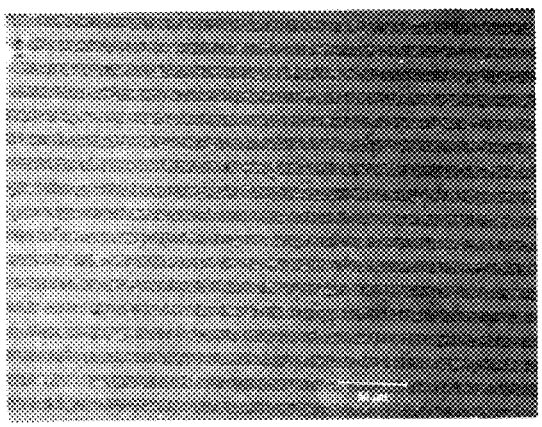
FIG. 4a is a micrograph (850×) of a strengthening layer having alternating electrolyte layers of ceria partially stabilized zirconia (CZ) and CZ with alumina (CZA) in an integrated SOFC according to an embodiment of the present invention.
Figure 4B:
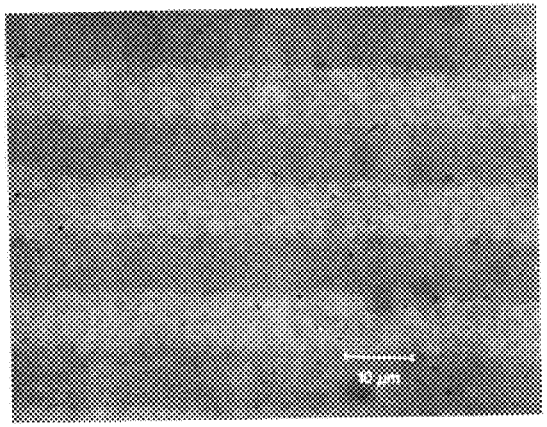

FIG. 4a is a micrograph (180×) of a strengthening layer 16 having alternating layers of ceria partially stabilized zirconia (CZ) and CZ with alumina (CZA) made by the tape calendering process described above. FIG. 4b is a micrograph (850×) of the strengthening layer 16 shown in FIG. 4a. Both micrographs indicate that multilayer structures can be fabricated with the tape calendering process.

Figure 5A:
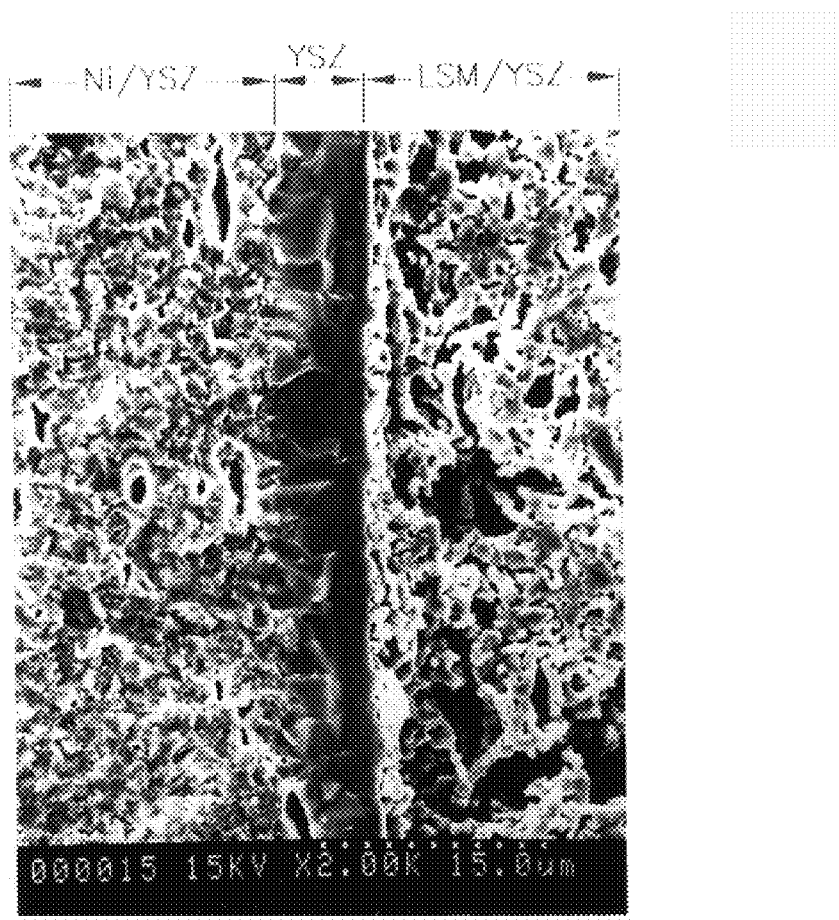
FIG. 5a is an SEM photograph (2.2 k×) of a single layer of YSZ electrolyte sandwiched between an LSM/YSZ cathode and a Ni/YSZ anode.

FIG. 5a is an SEM photograph (2.2 k×) of a single layer of YSZ electrolyte sandwiched between an LSM1YSZ cathode and a Ni/YSZ anode. The dense YSZ electrolyte was made by the tape calendaring process described above. FIG. 5a indicates that cells with dense electrolyte and porous electrodes of well known materials have been fabricated with the tape calendering process.

Figure 5B:
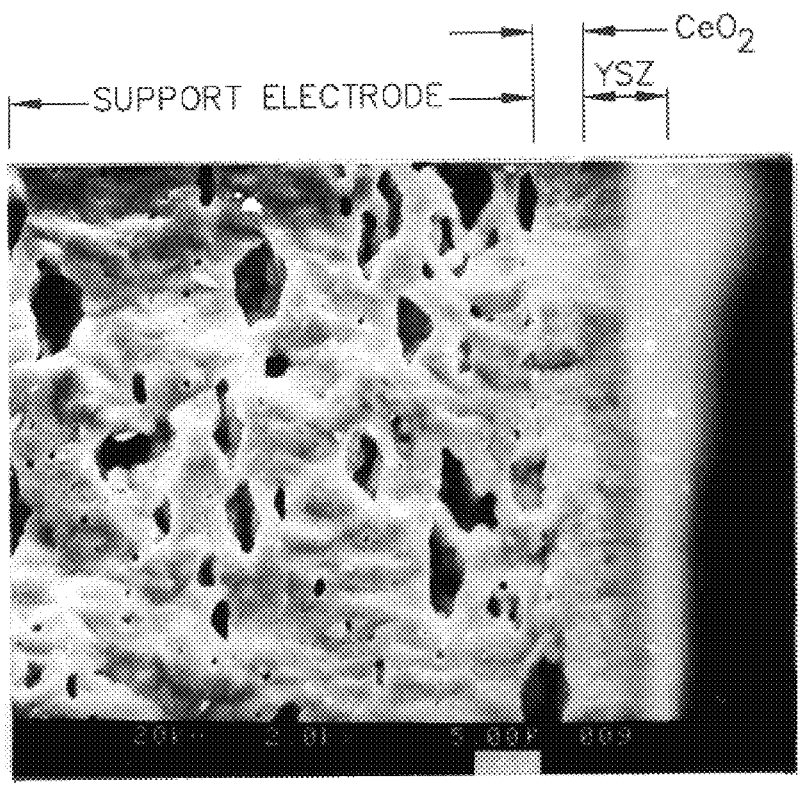
FIG. 5b is an SEM photograph (2.0 k×) of a bilayer electrolyte having a ceria layer and YSZ layer supported by an electrode.

FIG. 5b is an SEM photograph (2 k×) of a bilayer electrolyte 12 having a ceria layer and YSZ layer supported by an electrode. The electrolyte 12 was made in accordance with the tape calendaring process above. The SEM photograph indicates that multilayer materials can be fabricated with the tape calendering process.

As can be appreciated by those skilled in the art, the present invention provides an electrolyte for use in an SOFC with high ionic conductivity, chemical compatibility with Ni or other transition metals, and mechanical strength. In particular, the SOFC electrolyte can be used at reduced operating temperatures between about 450 to 800° C., while still providing high performance, including an ASR between about 0.01 to 2 ohm-cm$^2$. A thin-film electrolyte about 5 to 25 $\mu$m thick is also provided for use at reduced operating temperatures, in addition to being resistant to a fuel environment.

It should be understood, of course, that the foregoing relates to preferred embodiments of the invention and that modifications may be made without departing from the spirit and scope of the invention as set forth in the following claims.

We claim:
1. A solid oxide fuel cell comprising:
an anode;
a cathode opposite to said anode; and
an electrolyte between said anode and cathode, said electrolyte being a multilayer structure having a thickness between 5 and 25 $\mu$m and including a barrier layer positioned to prevent chemical interactions between said electrolyte and anode in addition to preventing elemental losses from said electrolyte.

2. The fuel cell of claim 1, wherein barrier layer has a thickness between 2 and 10 $\mu$m.

3. The fuel cell of claim 1, wherein the multilayer structure further comprises a transition layer between said barrier layer and said anode, said transition layer minimizing a thermal expansion mismatch between said anode and electrolyte.

4. The fuel cell of claim 1, wherein said electrolyte includes a strengthening layer, said strengthening layer providing mechanical strength to said electrolyte.

5. The fuel cell of claim 4, wherein said strengthening layer comprises a plurality of layer elements.

6. The fuel cell of claim 1, wherein said electrolyte comprises a transition metal reactive compound.

7. The fuel cell of claim 6, wherein said transition reactive compound comprises a gallate compound.

8. A solid oxide fuel cell comprising:
an anode;
a cathode opposite to said anode; and
an electrolyte between said anode and cathode, said electrolyte being a multilayer structure having a thickness between 5 and 25 $\mu$m and including a strengthening layer adjacent to said cathode, wherein the strengthening layer is comprised of alternating layer elements that provide fracture resistance to said electrolyte.

9. The fuel cell of claim 8, wherein the strengthening layer has a thickness between 5 and 15 $\mu$m.

10. The fuel cell of claim 8, wherein the multilayer structure further comprises a transition layer between said strengthening layer and said anode, said transition layer minimizing a thermal expansion mismatch between said anode and electrolyte.

11. The fuel cell of claim 10, wherein said transition layer comprises a transition electrolyte compound and a transition electronic conducting material.

12. The fuel cell of claim 11, wherein said transition layer electrolyte compound is selected from the group consisting of doped ceria, doped zirconia, doped hafnia, doped urania, and doped thoria.

13. The fuel cell of claim 11, wherein said transition layer electronic conducting material is selected from the group consisting of transition metals, electronic conducting oxides and mixed conducting oxides.

14. The fuel cell of claim 13, wherein said transition metals are selected from the group consisting of Ni, Fe, Cr, Co and Cu.

15. The fuel cell of claim 13, wherein said electronic and mixed conducting oxides are selected from the group consisting of doped ceria, doped titania, Ti doped zirconia, perovskite oxides with the formula $ABO_{3-d}$ where A is a rare earth element or a combination of rare earth and smaller amounts of a dopant, B is a transition metal or a combination of transition metals with smaller amounts of a dopant, d is greater than or equal to 0, brownmillerites based on $A_2B_2O_{5-d}$, pyrochlores based on $A_2B_2O_{7-d}$, and ceria-zirconia solid solutions.

16. The fuel cell of claim 8, wherein said electrolyte further includes a barrier layer positioned to prevent chemical interactions between said electrolyte and anode and preventing elemental losses from said electrolyte exposed to a fuel atmosphere.

17. The fuel cell of claim 16, wherein said barrier layer comprises a substantially dense compound selected from the group consisting of doped ceria, doped hafnia, doped zirconia, doped urania, doped thoria, ceria-zirconia solid solutions, perovskites, and pyrochlores.

18. The fuel cell of claim 8, wherein said anode comprises an anode electrolyte compound and an anode electronic conducting material.

19. The fuel cell of claim 18, wherein said anode electrolyte compound is selected from the group consisting of doped zirconia, doped ceria, doped hafnia, doped urania, doped thoria, and gallate-based oxides.

20. The fuel cell of claim 18, wherein said anode electronic conducting material is selected from the group consisting of transition metals and electronic conducting oxides.

21. The fuel cell of claim 8, wherein said electrolyte comprises a gallate compound comprising gallium and a rare earth metal.

22. The fuel cell of claim 21, wherein said rare earth metal is characterized by an atomic number from 57 to 71.

23. The fuel cell of claim 21, wherein said gallate compound further includes a first substitution element that can be substituted up to 50% for said rare earth metal, said first substitution element being selected from the group consisting of Sr, Ba, Mg, Ca and combinations thereof.

24. The fuel cell of claim 21, wherein said gallate compound further includes a second substitution element that can be substituted up to 50% for said gallium, said second substitution element being selected from the group consisting of Sr, Ba, Mg, Ca, Mn, Fe, Co, Cr, Cu and combinations thereof.

25. The fuel cell of claim 21, wherein said gallate compound is selected from the group consisting of $La_{1-x}Sr_xGa_{1-y}Mg_yO_{3-d}$, $La_{1-x}Sr_xGa_{1-y-z}Mg_yFe_zO_{3-d}$, and $La_{1-x}Sr_xGa_{1-y-z}Mg_yCo_zO_{3-d}$ or combinations thereof where x is between 0 and 0.2, y is between 0 and 0.3, z is between 0 and 0.2, and d is greater than or equal to 0.

26. The fuel cell of claim 8, wherein the relative thicknesses of the alternating layer elements are in a ratio of 1:1.

27. The fuel cell of claim 8, wherein said layer elements comprise a first oxygen ion conductor compound and a second oxygen ion conductor compound.

28. The fuel cell of claim 8, wherein said layer elements are selected from the group consisting of doped zirconia, doped zirconia with alumina, ceria with doped zirconia and alumina, a rare earth gallate compound, a rare earth gallate compound with ceria, and a rare earth gallate compound with ceria and alumina.

29. A method of making a solid oxide fuel cell, comprising:

forming a multilayer electrolyte structure between an anode and a cathode, wherein said multilayer electrolyte structure comprises a barrier layer positioned to minimize elemental losses from said electrolyte and to prevent chemical interactions between said electrolyte and anode, wherein said multilayer electrolyte structure has a thickness between 5 and 25 $\mu$m.

30. The method of claim 29, wherein said multilayer electrolyte structure comprises a strengthening layer which is comprised of alternating layer elements and which is adjacent to said cathode.

31. The method of claim 29, wherein said multilayer electrolyte structure comprises a transition layer adjacent said anode, to minimize a thermal expansion mismatch between said anode and said electrolyte.

32. The method of claim 31, wherein said transition layer is disposed between said barrier layer and said anode.

33. A method of making a solid oxide fuel cell, comprising:

forming a multilayer electrolyte structure between an anode and a cathode, wherein the electrolyte structure comprises a strengthening layer which is comprised of a plurality of layer elements and which is adjacent to said cathode, wherein said multilayer electrolyte structure has a thickness between 5 and 25 $\mu$m.

34. The method of claim 33, wherein said multilayer electrolyte structure comprises a barrier layer positioned to minimize elemental losses from said electrolyte and to prevent chemical interactions between said electrolyte and anode.

35. The method of claim 33, wherein said multilayer electrolyte structure comprises a transition layer adjacent to said anode, to minimize a thermal expansion mismatch between said anode and said electrolyte.

36. The method of claim 35, wherein said transition layer is disposed between said barrier layer and said anode.

* * * * *